(12) United States Patent
Kayl

(10) Patent No.: US 6,683,837 B1
(45) Date of Patent: *Jan. 27, 2004

(54) BREAK-AWAY DISC TRAY

(75) Inventor: Thomas A. Kayl, Sioux City, IA (US)

(73) Assignee: Gateway, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1188 days.

(21) Appl. No.: 08/685,162

(22) Filed: Jul. 23, 1996

(51) Int. Cl.$^7$ .............................................. G11B 33/02
(52) U.S. Cl. ........................................................ 369/77.1
(58) Field of Search ................................ 369/77.1–77.2, 369/75.1–75.2, 291, 292; 360/133, 132, 94; 206/455, 312

(56) References Cited

U.S. PATENT DOCUMENTS

| | | | |
|---|---|---|---|
| 4,481,617 A | * 11/1984 | Mabry | 369/75.1 |
| 4,653,039 A | 3/1987 | Ueno et al. | 369/75.2 |
| 4,773,056 A | 9/1988 | Ito | 369/75.2 |
| 4,875,578 A | 10/1989 | Nehl | 206/309 |
| 5,329,516 A | * 7/1994 | Hoshi et al. | 369/77.1 |
| 5,737,293 A | * 4/1998 | Kawamura et al. | 369/77.1 |

FOREIGN PATENT DOCUMENTS

JP 61-94262 * 5/1986 ................ 369/75.1

* cited by examiner

*Primary Examiner*—Allen Cao
(74) *Attorney, Agent, or Firm*—Scott Charles Richardson; Bradley A. Forrest; Schwegman, Lundberg, Woessner & Kluth

(57) ABSTRACT

A disc operating device comprising a multi-part disc holding tray which extends and retracts from a housing, and a disc information handling mechanism. The disc holding tray further comprises a moveable tray portion for movement and support within the housing, a disc supporting portion for supporting a disc and a break-away mechanism coupling these two portions. The, break-away mechanism comprises a first coupling that allows the disc supporting portion to deflect and potentially separate from the remainder of the disc holding tray upon impact by an external force. The disc supporting portion can further comprise a second coupling allowing deflection in multiple directions upon impact by an external force. Deflection and separation by the disc supporting portion reduce the need for and cost of repair and replacement of the overall disc operating device.

32 Claims, 6 Drawing Sheets

BREAK-AWAY DISC TRAY

FIELD OF THE INVENTION

The present invention relates generally to a disc drive or recorder, and in particular to a disc tray that is capable of breaking away from the drive/recorder.

BACKGROUND OF THE INVENTION

The present invention relates to a disc operating device (DOD), such as a CD-ROM drive, optical disc recorder, or optical disc drive. Uses for these DOD's include playing music, loading software applications onto a computer, playing computer games, and storing information, such as data, video, photographs, etc. The DOD is normally operated by loading a disc, such as a compact disc or optical disc, hereinafter referred to as a CD, into the device.

Methods of disc loading include placing the CD horizontally onto a tray which extends out from the DOD during loading, and then retracts horizontally into the body of the DOD for operation, or placing the CD into a carrier device, such as a cartridge, which is then inserted into an opening in the DOD for operation. In either loading method, the CD is placed into a circular recess to support the disc. A tray loading device may include one or more circular recesses into which a CD may be placed, thereby enabling the DOD to access or store information on multiple discs, either in a sequential fashion, or in a pre-programmed or random fashion.

For the tray loading device, a problem can arise when an operator forgets to retract the tray, and the tray is left in the open or extended position. Since the tray is basically hanging out beyond the DOD, and in many cases beyond the surface on which the DOD is located, such as a computer chassis or stereo system, the tray is extremely vulnerable to being broken off after being contacted by an object, or body part of the operator. When the force of the contact is more than minimal, there is a risk that major damage may occur to either the tray, the tray's ejection/retraction mechanism, or to the DOD. Since the tray is usually an integral part of the DOD, any damage to the tray results in a major expense to repair the DOD. In the extreme case, the user may have to replace the entire DOD.

What is needed is a disc operating device which includes a disc loading tray device that eliminates, or limits, damage to the DOD when the tray is contacted in the extended position by a force that would normally damage the DOD. What is also needed is a disc loading tray device that limits damage to a more expensive chassis or system in which it is contained, when subjected to such forces.

SUMMARY OF THE INVENTION

A disc operating device comprises a housing, in which a disc information handling mechanism is supported, and a disc holding tray. The disc holding tray is a multi-part unit including a first portion that is substantially internal and moveable within the housing, a second portion that supports the disc, and a break-away mechanism coupling the moveable tray portion to the disc supporting portion.

The break-away mechanism comprises a first hinged coupling allowing the disc supporting portion to deflect upon impact by an external force. Once this portion has deflected, it can be returned to its normal operating position automatically, or by operator intervention.

In a further embodiment, the break-away mechanism comprises a combination of detents and pins, fixed or spring, allowing the disc supporting portion to not only deflect, but also to potentially non-destructively separate from the moveable tray portion upon impact by an external force. Variations on the break-away mechanism include combinations of pins, detents and magnetic couplings.

The disc supporting portion of the disc holding tray can also be a multi-part unit wherein the disc holding portion connects to an intermediate coupling portion by a second hinged coupling substantially perpendicular to the first hinged coupling. This second hinge also allows deflection of the disc holding portion about the hinge upon impact by an external force. After deflection about the second hinged coupling, the disc holding portion returns to its normal operating position automatically, or by operator intervention. The addition of the second hinged coupling allows the disc supporting tray to withstand impact of external forces from any direction.

Advantageously, the present invention provides a disc operating device including a disc holding tray that eliminates or limits damage to the DOD when the tray is contacted in the extended position by an external force that would normally damage the DOD. The present invention also provides a disc holding tray including a stress relief mechanism capable of isolating the DOD from the impact of an external force, in order to limit damage to the DOD. In addition, the present invention provides a disc holding tray with a stress relief mechanism serving as a break-away point for the tray from the DOD such that the tray can deflect or separate from the DOD upon impact by an external force. Also provided is a disc supporting tray design that is easy to reattach, or inexpensive to repair or replace. When a DOD becomes damaged internally due to a force applied to an open tray, the cost of the damage can extend far beyond the tray itself. In many cases, the DOD is an integral part of a larger unit, such as a stereo or computer, thus increasing the complexity and cost of repair or replacement astronomically. The present invention eliminates the worries associated with possible damage to costly electronic equipment, and brings the potential repair costs within a reasonable and manageable limit.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1A:
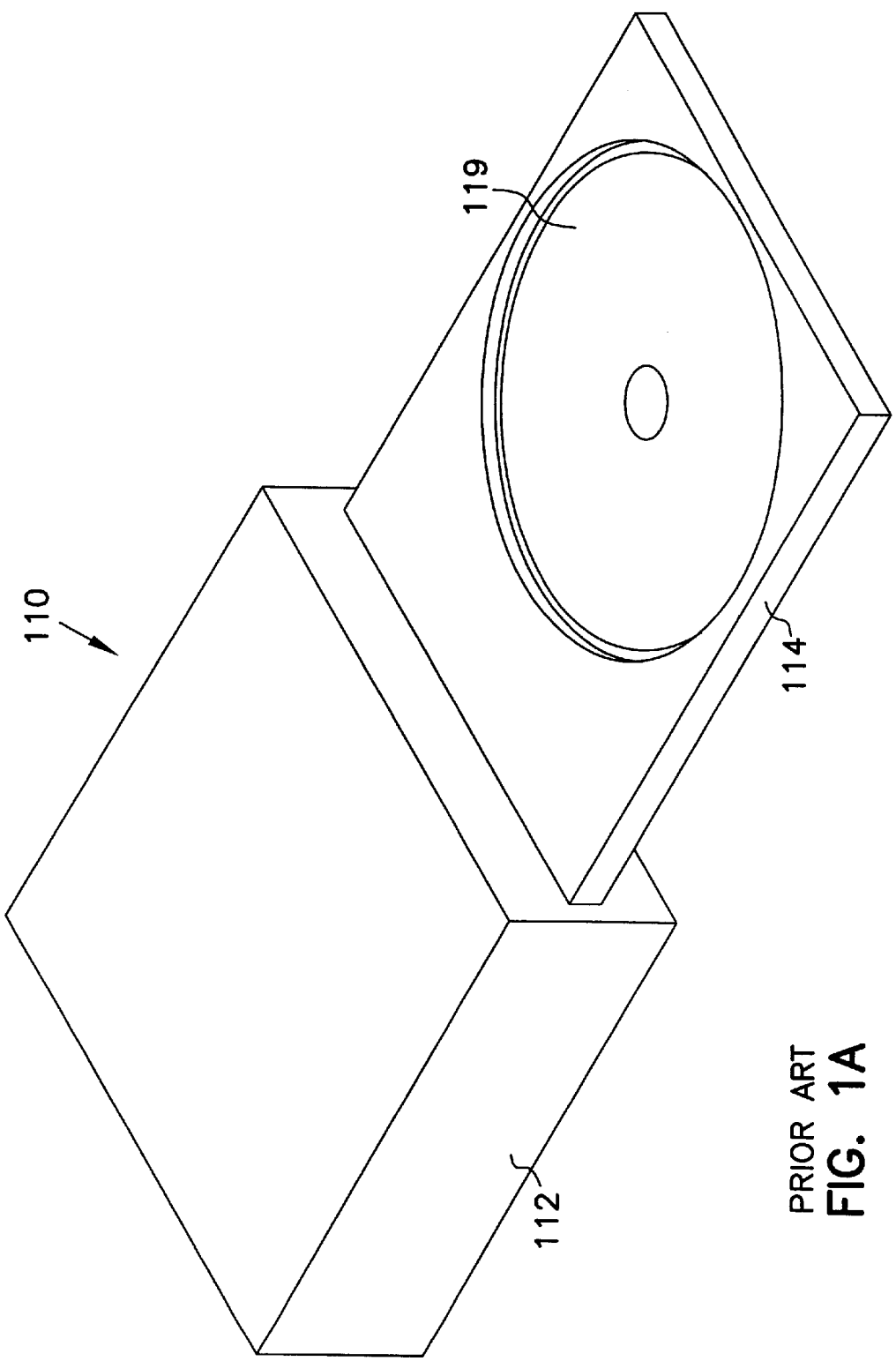
FIG. 1A is an perspective view of a prior art disc operating device showing a disc supporting tray which extends and retracts from a housing.

Referring now to the drawings, FIG. 1a illustrates a disc operating device (DOD) 110 of the prior art, such as a CD-ROM drive, an optical disc recorder, or an optical disc drive. The DOD 110 includes a housing 112 containing a disc information handling mechanism, and a disc holding tray 114 including a recess or other method for supporting a disc 119. The disc holding tray 114 is a single unit which moves within the housing 112 such that the area containing the disc extends beyond the housing 112 to enable loading and unloading of the disc. The disc holding tray 114 engages a support and movement mechanism within the housing 112, thus allowing extension and retraction of the disc holding tray 114, but also causing this tray 114 to be an integral part of the DOD 110, such that any damage to this tray 114 requires repair or replacement of the entire DOD 110, at great expense.

Figure 1B:
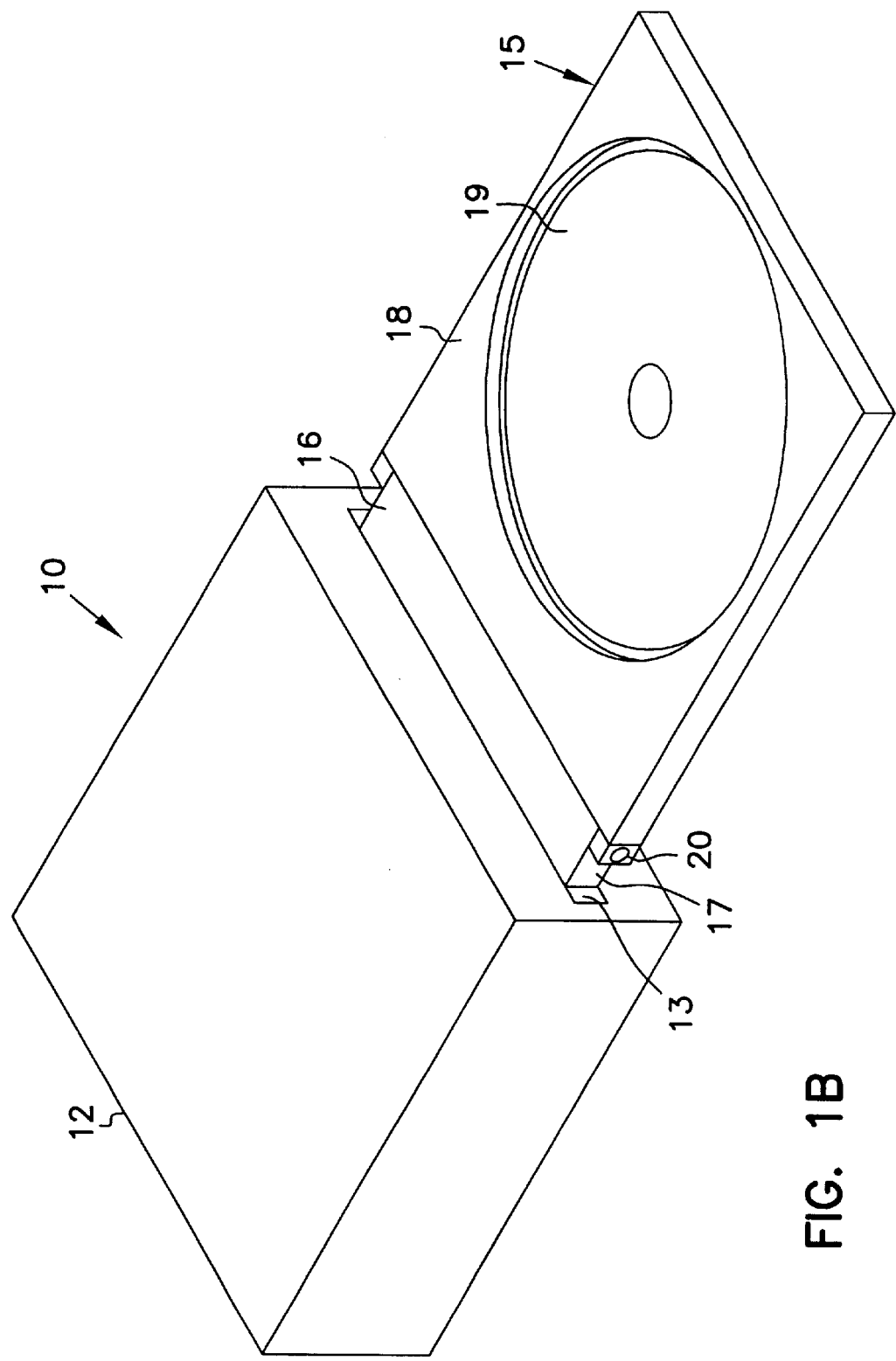
FIG. 1B is an perspective view of a disc operating device showing a multi-part disc holding tray of the present invention.

FIG. 1b illustrates a disc operating device 10 incorporating the present invention. This DOD 10 also includes a housing 12 which contains a disc information handling mechanism, and a disc holding tray 15 including a recess or other method for supporting a disc 19. However, in the present invention, the disc holding tray 15 is a multi-part unit including a first portion 16 and a second portion 18 coupled together by a break-away mechanism 20, fabricated from a light-weight, break resistant material compatible with the operation of the DOD. Several different embodiments of the break-away mechanism 20 will be discussed below. The first portion 16, or moveable tray portion, moves within the housing 12, is substantially internal to the housing 12, has a section 17 external to the housing 12 when the disc holding tray 15 is in the extended position, and passes through a housing opening 13. The second portion 18, or disc supporting tray, supports the disc 19 and extends and retracts from the housing.

In the present invention, the requirement of total repair or replacement of the DOD 10 is overcome by use of this multi-part disc holding tray 15. The moveable tray portion 16 engages a support and movement mechanism within the housing 12 of the DOD 10, similar to the single unit disc holding tray 114, shown in FIG. 1a. However, the disc supporting tray 18, which extends beyond the housing 12 for loading and unloading of a disc 19, is not directly connected to the support and movement mechanism within the housing 12, but is coupled to it through the breakaway mechanism 20. This break-away mechanism 20 serves as a stress relief for the entire disc holding tray 15 by isolating the moveable tray portion 16 from external contact forces that would normally damage the tray 15 and the DOD 10. Upon impact by these external forces, when the disc holding tray 15 is in the extended or open position, the break-away mechanism 20 allows the disc supporting tray 18 to deflect or to separate from the moveable tray portion 16, thus eliminating or limiting damage to the DOD 10. After separation, the disc supporting tray 18 can then be easily reattached if not significantly damaged, or if necessary, repaired or replaced in less time and at less expense than the DOD 10.

Figure 2:
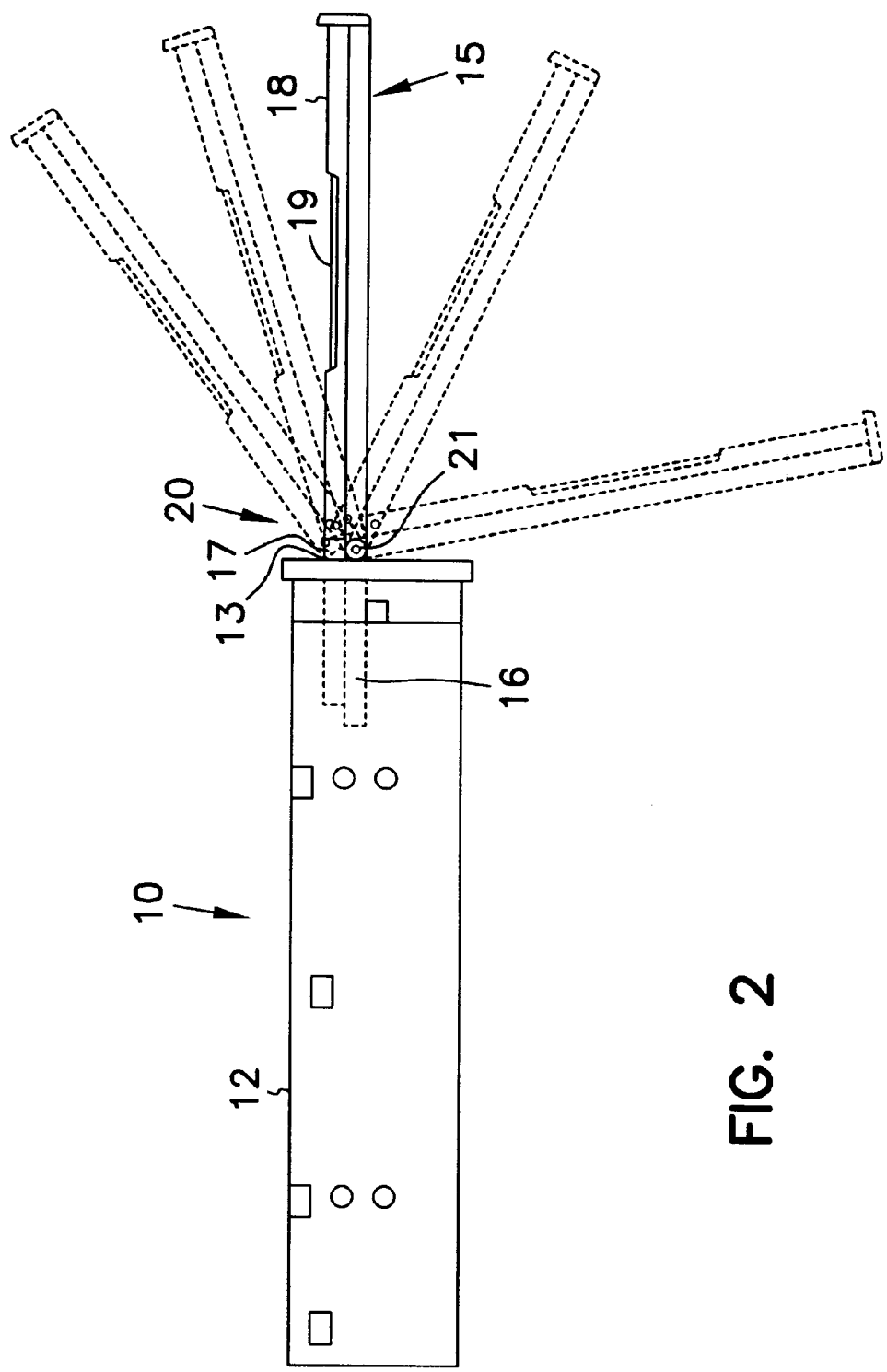
FIG. 2 is a side view of a disc operating device showing various deflections of a disc supporting tray.

In FIG. 2, the break-away mechanism 20 is shown coupling the moveable tray portion 16 to the disc supporting tray 18 with a first hinged coupling 21. The connection between the break-away mechanism 20 and the moveable tray portion 16 occurs at the tray's external section 17. This hinge-type connection allows the disc supporting tray 18 to deflect about the first hinged coupling 21 as shown, upon impact by an external force. Once the disc supporting tray 18 is in a deflected position, it can return to a normal operating position automatically, using a spring mechanism for example, or by electronic or manual operator intervention. Unless the return of the disc supporting tray 18 to a normal operating position is coupled to the retraction mechanism, retraction of the disc holding tray 15 should be disabled anytime the disc supporting tray 18 is not in the normal operating position in order to eliminate further damage to the DOD 10. Detection of the disc supporting tray 18 being in other than the normal operating position is possible by use of a microswitch, for example. When the return of the disc supporting tray 18 is coupled to the retraction mechanism, operator initiated retraction causes either automatic return to a normal position prior to retraction, or gradual return to a normal position as the housing opening 13 guides the disc supporting tray 18 into the normal position during retraction.

Figure 3:
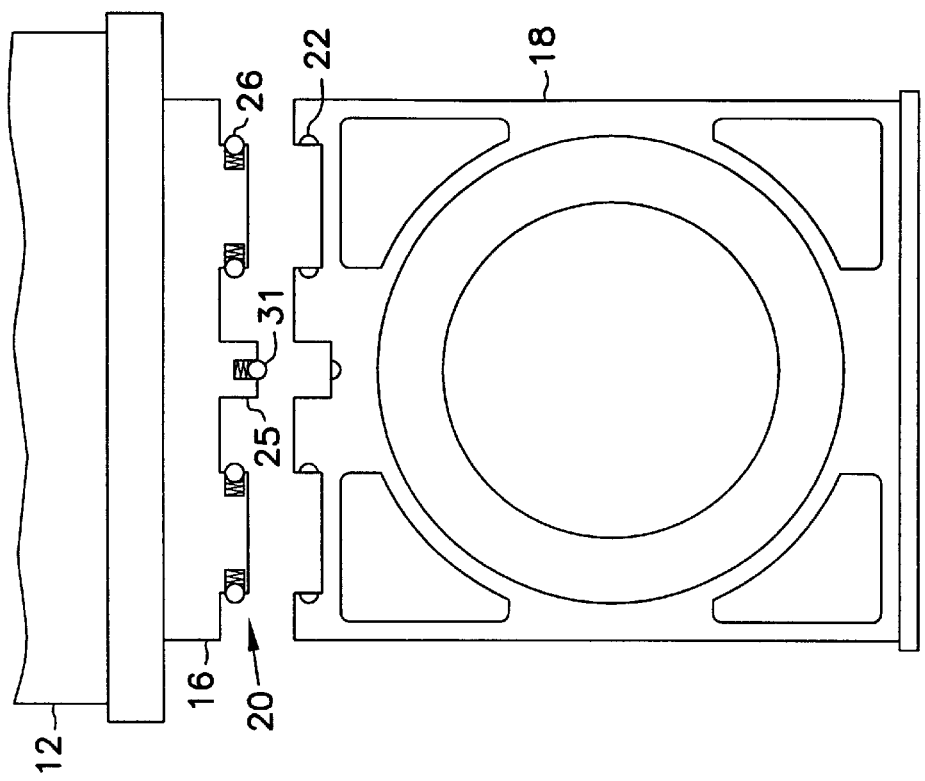
FIG. 3 is a top view of a disc supporting tray separated from a moveable tray portion at a break-away mechanism which includes pins and detents.
Figure 4:
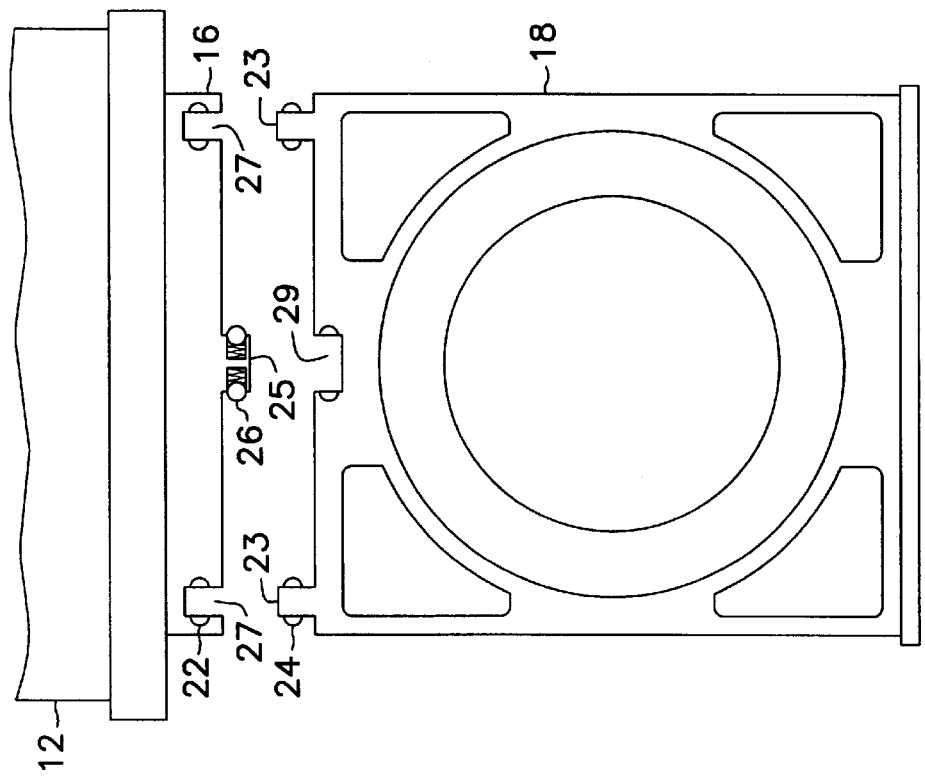
FIG. 4 is a detail view of a break-away mechanism with spring-loaded pins and detents.
Figure 5:
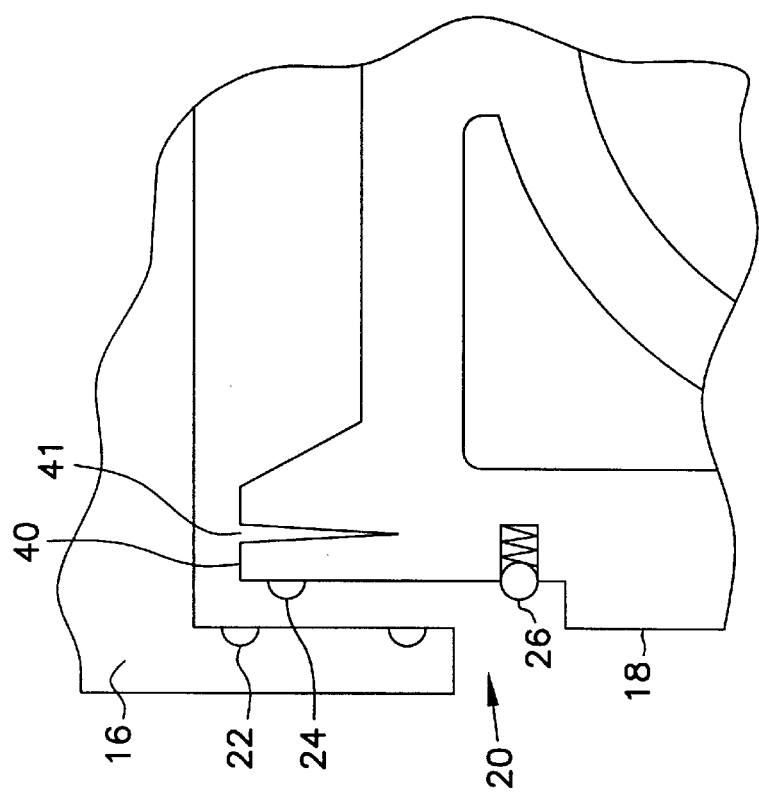
FIG. 5 is a top view of a disc supporting tray showing an alternate configuration of a break-away mechanism with pins and detents.

Now turning to FIGS. 3–5, in one of the preferred embodiments, the break-away mechanism 20 further comprises a combination of mating pins 24 and detents 22 allowing separation of the disc supporting tray 18 from the moveable tray portion 16 upon impact, as shown in FIGS. 3–5. There may be fixed pins 24 or spring pins 26, depending on the corresponding structure and requirements. Detents 22 intended for coupling with fixed pins 24 must have at least one flexible side wall to allow release at a desired force. Spring pins 26 are also formed with a desired spring constant to provide retentive force when subjected to normal operating forces, and release when subjected to predetermined, normally harmful forces.

Those skilled in the art can come up with unlimited possible connection variations, so only a few illustrative examples are shown. FIG. 3 shows a combination of fixed pins 24, spring pins 26 and detents 22 distributed on both the moveable tray portion 16 and the disc supporting tray 18. The fixed pins 24 are symmetrically located on opposite sides of protrusions 23, which reside near the outer edges of the disc supporting tray 18. The mating detents 22 are correspondingly located on the facing sides of insets 27 near the outer edges of the moveable tray portion 16. The spring pins 26 are located on opposite sides of a center protrusion 25 on the moveable tray portion 16, with the mating detents 22 located on facing sides of a center inset 29 on the disc supporting tray 18. FIG. 4 shows only spring pins 26 mounted on the moveable tray portion 16 and detents embedded on the disc supporting tray 18. FIG. 5 illustrates a detail of the breakaway mechanism 20, where both a fixed pin 24 and a spring pin 26 are mounted on the disc supporting tray 18, and corresponding detents 22 are embedded in the moveable tray portion 16. The fixed pin 24 and detent 22 combination provide the desired hinge-type action. A split 41 in the disc supporting tray 18 creates a tension element 40 on which the fixed pin 24 is mounted allowing for both this fixed pin 24 and the spring pin 26 to provide appropriate tension to hold the disc supporting tray 18 in the normal operating position until impact causes deflection or separation.

Figure 6:
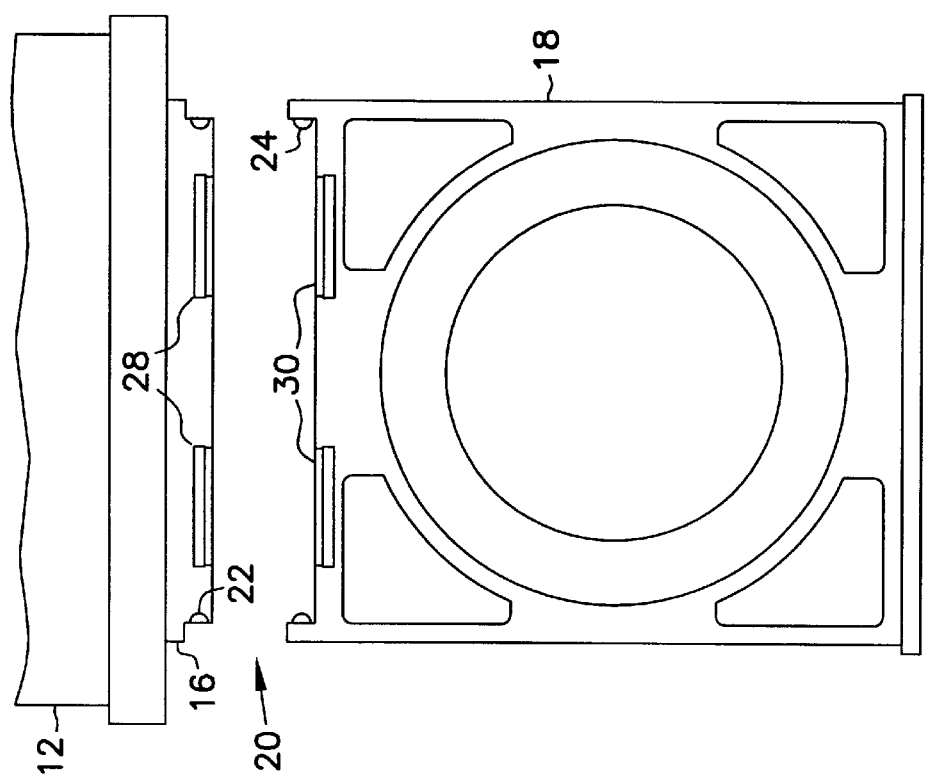
FIG. 6 is a top view of a disc supporting tray showing an alternate configuration of a break-away mechanism with pins, detents and magnets.

In addition to or in place of pins and detents, numerous other couplings could be used to provide the desired characteristics of deflectability, positionability and separability. FIG. 6 illustrates an alternate preferred embodiment where the break-away mechanism 20 uses magnetic couplings 28, 30, in addition to the pin 24 and detent 22 pairs to provide the desired characteristics. The moveable tray portion 16 includes at least one magnet 28, while the disc supporting tray 18 includes at least one corresponding area of magnetic material 30, such as steel or another magnet. The magnetic couplings 28, 30 could be located on either portion, in any combination.

Figure 7:
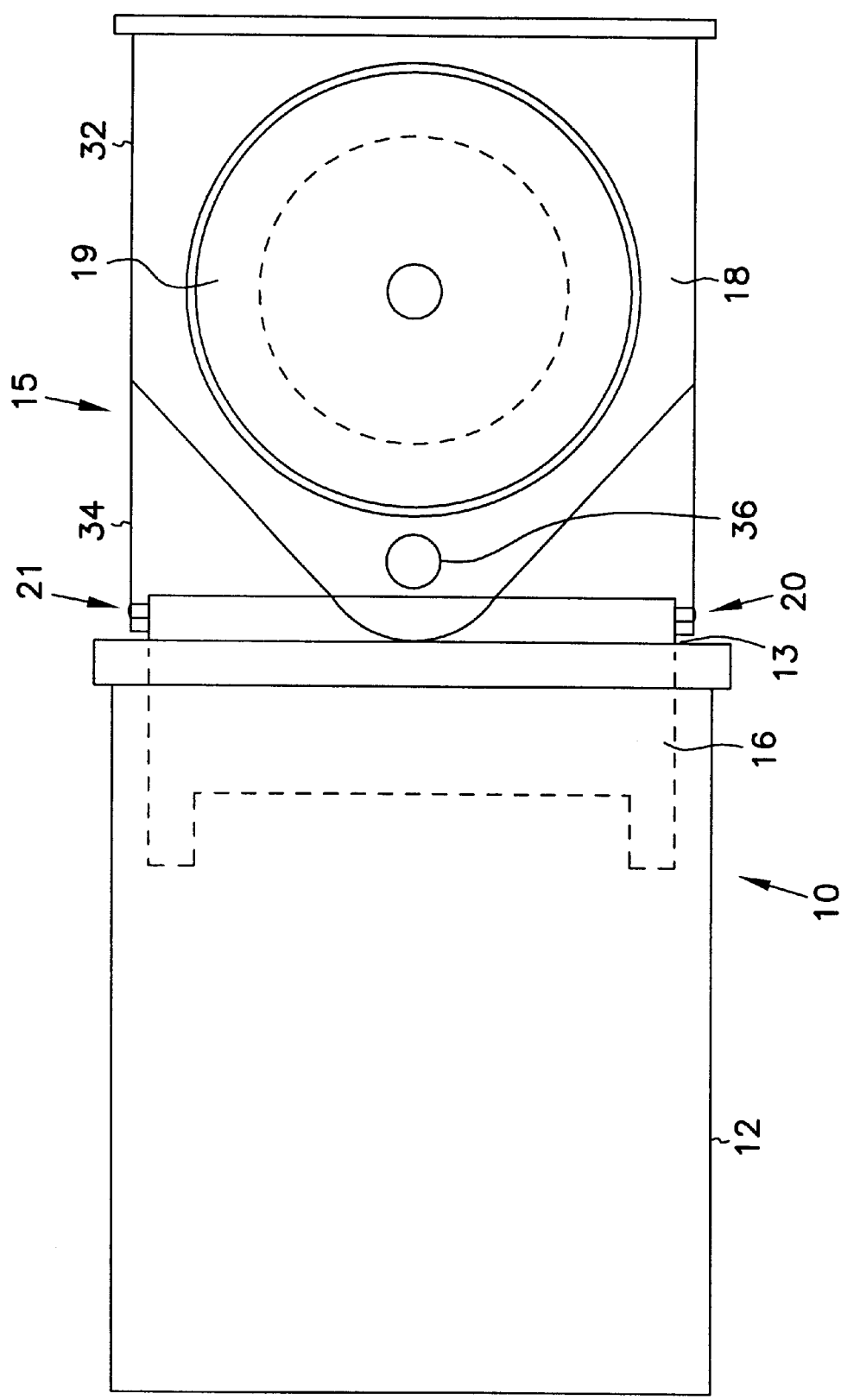
FIG. 7 is a top view of a disc operating device showing a disc supporting tray which includes a hinged coupling about which a disc holding portion of the tray can deflect on impact.

FIG. 7 illustrates a DOD 10 with a multi-part disc holding tray 15, where the disc supporting tray 18 is also a multi-part unit. A disc holding portion 32 includes a recess or other method of supporting a disc 19. An intermediate coupling portion 34 engages the break-away mechanism 20 on one side and the disc holding portion 32 on the other side. A second hinged coupling 36 is substantially perpendicular to the first hinged coupling 21, and connects the intermediate coupling portion 34 to the disc holding portion 32.

As with the first hinged coupling 21, the second hinged coupling 36 allows the disc holding portion 32 to deflect upon impact by an external force, thereby further isolating the moveable tray portion 16 from external contact forces that would normally damage the tray 15 and the DOD 10. The direction of deflection about the second hinged coupling 36 is substantially perpendicular to the direction of deflection about the first hinged coupling 21, thus increasing the disc supporting tray's 18 ability to withstand external forces from any direction. Once the disc holding portion 32 is in a deflected position, it can return to a normal operating position automatically, using a spring mechanism for example, or by operator intervention, either electronically or manually. Unless the return of the disc holding portion 32 to a normal operating position is coupled to the retraction mechanism, retraction of the disc holding tray 15 should be disabled anytime the disc holding portion 32 is not in the normal operating position in order to eliminate further damage to the DOD 10. Detection of the disc holding portion 32 being in other than the normal operating position is possible by use of a microswitch, for example. When the return of the disc holding portion 32 is coupled to the retraction mechanism, operator initiated retraction causes either automatic return to a normal position prior to retraction, or gradual return to a normal position as the housing opening 13 guides the disc holding portion 32 into the normal position during retraction.

As can be seen from the above description, the advantages of the present invention are apparent. The break-away mechanism of the multi-part disc holding tray absorbs the impact of external forces by allowing the deflection or separation of the disc supporting tray. Therefore, when a disc operating device is left in the open or extended position and comes in contact with an external force, instead of damaging the entire DOD requiring costly repair or even replacement, the disc supporting tray will deflect or break off. This results in potential damage only to the separated disc supporting tray, which is easy to reattach, or if necessary, inexpensive and quick to repair or replace, and not to the expensive DOD.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc operating device comprising:
    a housing supporting a disc information handling mechanism; and
    a disc holding tray, further comprising:
        a first portion substantially internal and moveable within the housing of the disc operating device;
        a second portion, for supporting a disc, that extends and retracts from the housing; and
        a break-away mechanism coupling the first portion to the second portion, the break-away mechanism being adapted for preventing damage to the disc holding tray upon impact of an external force to the second portion when the second portion is extended from the housing.

2. The disc operating device described in claim 1, wherein the break-away mechanism comprises a first coupling allowing the second portion to deflect upon application of the external force.

3. The disc operating device described in claim 2, wherein the first coupling is a hinge.

4. The disc operating device described in claim 3, wherein the second portion further comprises:
    a disc holding portion for supporting the disc;
    an intermediate coupling portion engaging the break-away mechanism; and
    a second hinged coupling substantially perpendicular to the first hinged coupling connecting the disc holding portion to the intermediate coupling portion.

5. The disc operating device described in claim 2, wherein the second portion automatically returns to a normal operating position after application of the external force to the second portion.

6. The disc operating device described in claim 2, wherein an operator returns the second portion to a normal operating position after application of the external force to the second portion.

7. The disc operating device described in claim 1, wherein the break-away mechanism further comprises a combination of pins and detents allowing the second portion to engage the first portion, and upon application of the external force to the second portion, allowing the second portion to separate from the first portion.

8. The disc operating device described in claim 7, wherein at least one of the pins is spring-loaded.

9. The disc operating device described in claim 8 wherein the break-away mechanism further comprises a magnet attached to one of either the first portion or the second portion.

10. The disc operating device described in claim 7, wherein the break-away mechanism further comprises a magnet attached to one of either the first portion or the second portion.

11. The disc operating device described in claim 1, wherein the second portion further comprises:
    a disc holding portion for supporting a disc;
    an intermediate coupling portion engaging the break-away mechanism; and
    a second coupling connecting the disc holding portion to the intermediate coupling portion.

12. The disc operating device described in claim 11, wherein the disc holding portion automatically returns to a normal operating position about the second coupling after deflection due to the application of the external force to the second portion.

13. The disc operating device described in claim 11, wherein an operator returns the disc holding portion to a normal operating position after application of the external force to the second portion.

14. The disc operating device described in claim 11, wherein the break-away mechanism further comprises a combination of pins and detents that allow the second portion to engage the first portion, and upon application of the external force, allow the second portion to separate from the first portion.

15. The disc operating device described in claim 14, wherein at least one of the pins is spring-loaded.

16. The disc operating device described in claim 15, wherein the break-away mechanism further comprises a magnet attached to one of either the first portion or the second portion.

17. The disc operating device described in claim 14, wherein the break-away mechanism further comprises a magnet attached to one of either the first portion or the second portion.

18. A disc supporting tray, used in conjunction with a moveable tray portion substantially within a disc operating device, comprising:

a disc holding portion for supporting a disc; and an intermediate coupling portion, attached to the disc holding portion on one end and engaging a break-away mechanism on the other end, the break-away mechanism adapted for preventing damage to the disc supporting tray upon impact of an external force to the disc holding portion.

19. The disc supporting tray described in claim 18, wherein the break-away mechanism comprises a first coupling allowing the disc supporting tray to deflect upon application of the external force.

20. The disc supporting tray described in claim 19, wherein the first coupling is a hinge.

21. The disc supporting tray described in claim 19, wherein the disc supporting tray automatically returns to a normal operating position after application of the external force to the disc holding portion.

22. The disc supporting tray described in claim 19, wherein the break-away mechanism further comprises a combination of pins and detents.

23. The disc supporting tray described in claim 22, wherein the break-away mechanism further comprises a magnet (half of a magnetic coupling) attached to the intermediate coupling portion.

24. The disc supporting tray described in claim 22, wherein at least one of the pins is spring-loaded.

25. The disc supporting tray described in claim 19, further comprising a second coupling connecting the disc holding portion to the intermediate coupling portion.

26. The disc supporting tray described in claim 25, wherein the second coupling is a hinge.

27. The disc supporting tray described in claim 25, wherein the disc holding portion automatically returns to a normal operating position about the second coupling after deflection due to the application of the external force to the disc holding portion.

28. The disc supporting tray described in claim 25, wherein the break-away mechanism further comprises a combination of pins and detents.

29. The disc supporting tray described in claim 25, wherein at least one of the pins is spring-loaded.

30. The disc supporting tray described in claim 29, wherein the break-away mechanism further comprises a magnet (half of a magnetic coupling) attached to the disc supporting tray.

31. A method of fabricating a disc operating device comprising the steps of:

securing a disc operating mechanism in a housing;

mounting a moveable tray portion within the housing; and coupling a disc supporting tray to the moveable tray portion such that the disc supporting tray extends to an extended position away from the housing, the coupling including a break-away mechanism, the break-away mechanism being adapted for preventing damage to the disc supporting tray upon impact of an external force to the disc supporting tray.

32. The method of fabricating a disc operating device described in claim 31, wherein the disc supporting tray is coupled to the moveable tray portion with a break-away mechanism prior to mounting the moveable tray portion within the housing.

* * * * *